United States Patent
Graham et al.

(10) Patent No.: US 8,407,757 B2
(45) Date of Patent: Mar. 26, 2013

(54) SPECIFYING AND ENFORCING RUN-TIME POLICIES FOR APPLICATION PROCESSES BEING EXECUTED ON A COMPUTER

(75) Inventors: Jon E. Graham, San Jose, CA (US); Anurag Sharma, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 11/969,842

(22) Filed: Jan. 4, 2008

(65) Prior Publication Data

US 2009/0178103 A1    Jul. 9, 2009

(51) Int. Cl.
*G06F 21/00* (2006.01)

(52) U.S. Cl. .......... 726/1; 726/26; 726/27; 726/28; 726/29; 726/30; 726/31; 726/32; 726/33; 726/22; 726/23; 726/24; 726/25; 713/153; 713/154; 713/164; 713/165; 713/166; 713/167

(58) Field of Classification Search .......... 726/1, 26–33, 726/22–25; 713/153–154, 164–167
See application file for complete search history.

(56) References Cited

U.S. PATENT DOCUMENTS

| | | | |
|---|---|---|---|
| 6,760,913 B1 | 7/2004 | Bailey et al. | |
| 6,928,585 B2 * | 8/2005 | Bartley | 714/23 |
| 7,043,524 B2 * | 5/2006 | Shah et al. | 709/203 |
| 7,116,440 B2 * | 10/2006 | Eichhorn et al. | 358/1.5 |
| 7,177,934 B2 | 2/2007 | Matena et al. | |
| 7,681,226 B2 * | 3/2010 | Kraemer et al. | 726/1 |
| 7,853,678 B2 * | 12/2010 | Khemani et al. | 709/223 |
| 2004/0181788 A1 * | 9/2004 | Kester et al. | 717/168 |
| 2005/0055565 A1 | 3/2005 | Fournet et al. | |
| 2005/0076030 A1 | 4/2005 | Hada et al. | |
| 2005/0131960 A1 | 6/2005 | Reed et al. | |
| 2006/0069758 A1 * | 3/2006 | Hunt et al. | 709/220 |
| 2006/0122975 A1 | 6/2006 | Taylor et al. | |
| 2006/0288207 A1 | 12/2006 | Brown et al. | |
| 2007/0006278 A1 | 1/2007 | Ioan Avram et al. | |
| 2007/0150956 A1 | 6/2007 | Sharma et al. | |
| 2007/0261120 A1 * | 11/2007 | Arbaugh et al. | 726/26 |
| 2007/0261124 A1 | 11/2007 | Centonze et al. | |
| 2008/0077638 A1 * | 3/2008 | Monk et al. | 707/205 |
| 2009/0141895 A1 * | 6/2009 | Anderson et al. | 380/252 |
| 2012/0216244 A1 * | 8/2012 | Kumar et al. | 726/1 |

OTHER PUBLICATIONS

Yin Jin et. Al., "Specification and Runtime Enforcement of Security Policies", Sep. 18-21, 2007, 2007 IFIP International Conference on Network and Parallel Computing.*

* cited by examiner

*Primary Examiner* — Thanhnga B Truong
*Assistant Examiner* — Josnel Jeudy
(74) *Attorney, Agent, or Firm* — Leonard T. Guzman; Mohammed Kashef

(57) ABSTRACT

The present invention provides a method and system of specifying and enforcing at least one run-time policy for at least one computer process executing on a computer system, where the computer system includes a computer operating system. In an exemplary embodiment, the method and system include (1) relating the policy with an executable file of the process, (2) associating the policy with a running instance of the process, and (3) enforcing the policy on the running instance.

21 Claims, 21 Drawing Sheets

SPECIFYING AND ENFORCING RUN-TIME POLICIES FOR APPLICATION PROCESSES BEING EXECUTED ON A COMPUTER

FIELD OF THE INVENTION

The present invention relates to computer systems, and particularly relates to a method and system of specifying and enforcing at least one run-time policy for at least one computer process executing on a computer system, where the computer system includes a computer operating system.

BACKGROUND OF THE INVENTION

A computer system typically includes an operating system. Computer processes running on the computer system may attempt to access at run-time the computer system's file system, system configuration, and/or network stack.
Need to Enforce Run-Time Policies on Computer Processes A computer system needs the ability to perform enforce run-time policies on computer processes executing on the computer system. If a computer process that is configured to prevent intrusions into the computer system is running on the computer system, the computer system may need to enforce restrictive policies for a web-browsing program (which needs to be sandboxed to minimize damage to the system) and more permissive policies for a program used to update applications on the system. Thus, such a system would want to be able to (i) persistently attach a particular policy with a particular program executable residing on the system and (ii) reliably locate and enforce this attached policy, when the program is launched and starts performing activity.
Prior Art Systems One prior art system applies policies based on the user-id under which the process is executing. This prior art system does not allow for differentiation of policies on a per-process level when all processes are executing under the same user-id. Furthermore, on a computer system running a Microsoft Corporation Windows operating system (hereinafter "Windows"), running application processes under separate user-ids would cause usability issues since the user-profile settings (such as Desktop and "my documents" folders, and the current-user registry-hive) would be completely different for each user-id.

Another prior art system identifies processes based on the executable-name (not the entire file-path). This limitation exists because the documented application program interfaces (APIs) in Windows for receiving process-creation information do not always supply the entire-path of the executable being launched. Undocumented means (such as operating-system-call hooking) are available, but suffer from reliability and portability issues.

In addition, another prior art system (in Windows) provides a hard-coded set of policies that can be enforced on a per-program basis. Unfortunately, this hard-coded set of policies cannot be meaningfully extended by third-party developers who wish to enforce their own policies during program execution. Prior Art FIG. 1 is a block diagram a typical prior art system.

Therefore, a method and system of specifying and enforcing at least one run-time policy for at least one computer process executing on a computer system, where the computer system includes a computer operating system, is needed.

SUMMARY OF THE INVENTION

The present invention provides a method and system of specifying and enforcing at least one run-time policy for at least one computer process executing on a computer system, where the computer system includes a computer operating system. In an exemplary embodiment, the method and system include (1) relating the policy with an executable file of the process, (2) associating the policy with a running instance of the process, and (3) enforcing the policy on the running instance.

In an exemplary embodiment, the relating includes (a) storing the policy with the file in at least one alternate data stream and (b) allowing the policy to be retrieved from the alternate data stream by at least one attribute of the file. In an exemplary embodiment, the relating includes (a) storing the policy in a database entry in a database, wherein the database entry is associated with the file and (b) allowing the policy to be retrieved from the database by at least one attribute of the file. In an exemplary embodiment, the allowing includes allowing the policy to be retrieved from the alternate data stream by at least one attribute of the file, wherein the attribute is selected from the group consisting of the path of the file, the file identifier of the file, a digital signature of the file, and a checksum over the data in the file. In an exemplary embodiment, the allowing includes allowing comprises allowing the policy to be retrieved from the database by at least one attribute of the file, wherein the attribute is selected from the group consisting of the path of the file, the file identifier of the file, a digital signature of the file, and a checksum over the data in the file.

In an exemplary embodiment, the associating includes using a kernel-mode monitor to track at least one access by the process to the computer system. In an exemplary embodiment, the using includes using the monitor to track at least one access by the process to the file-system of the computer system. In an exemplary embodiment, the using includes using the monitor to track at least one access by the process to the system configuration of the computer system. In an exemplary embodiment, the using includes using the monitor to track at least one access by the process to a computer network that is logically connected to the computer system.

In an exemplary embodiment, the using includes, if the monitor detects a process-creation notification associated with the process, classifying the process as running under an unclassified policy. In an exemplary embodiment, the using includes, if the monitor detects at least one access by the process to the computer system, (a) intercepting the input/output of the process and (b) checking the classification of the process. In a further embodiment, the using further includes, if the process is running under an unclassified policy, (i) recording the process identifier of the process, (ii) blocking the process from proceeding further, and (iii) forwarding the process identifier to a privileged user-mode daemon. In a further embodiment, the using further includes verifying the process via the daemon.

In an exemplary embodiment, the verifying includes (a) locating the path of the file via the process identifier and at least one application program interface of the operating system, (b) retrieving the policy that is related to the process, and (c) returning the retrieved policy to the kernel-mode monitor. In an exemplary embodiment, the retrieving includes retrieving the policy by at least one attribute of the file. In an exemplary embodiment, the retrieving includes (i) retrieving the policy by at least one attribute of the file, where the attribute is selected from the group consisting of the path of the file, the file identifier of the file, a digital signature of the file, and a checksum over the data in the file and (ii) returning the found policy. In a further, the retrieving includes, if the finding fails, returning a default policy.

In an exemplary embodiment, the enforcing includes using the kernel-mode monitor to enforce the retrieved policy. In an exemplary embodiment, the using includes (a) classifying the process as running under a classified policy, (b) enforcing the retrieved policy on the access that had been detected by the monitor, and (c) enforcing the retrieved policy on at least one subsequent operation performed by the process.

The present invention also provides a computer program product usable with a programmable computer having readable program code embodied therein of specifying and enforcing at least one run-time policy for at least one computer process executing on a computer system. The computer program product includes (1) computer readable code for relating the policy with an executable file of the process, (2) computer readable code for associating the policy with a running instance of the process, and (3) computer readable code for enforcing the policy on the running instance.

THE FIGURES

DETAILED DESCRIPTION OF THE INVENTION

The present invention provides a method and system of specifying and enforcing at least one run-time policy for at least one computer process executing on a computer system, where the computer system includes a computer operating system. In an exemplary embodiment, the method and system include (1) relating the policy with an executable file of the process, (2) associating the policy with a running instance of the process, and (3) enforcing the policy on the running instance.

Figure 1:
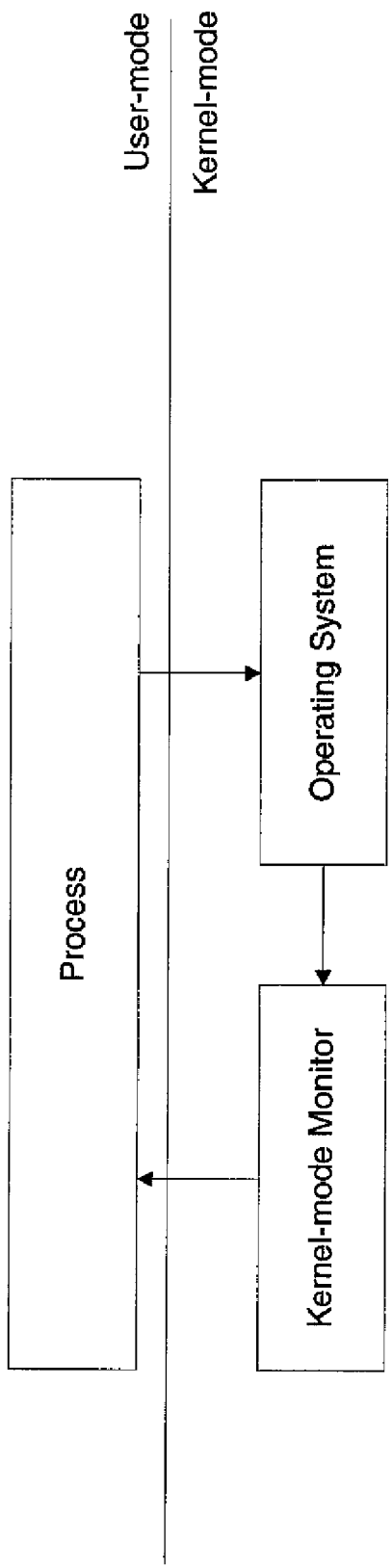
FIG. 1 is a block diagram of a prior art system.
Figure 2A:
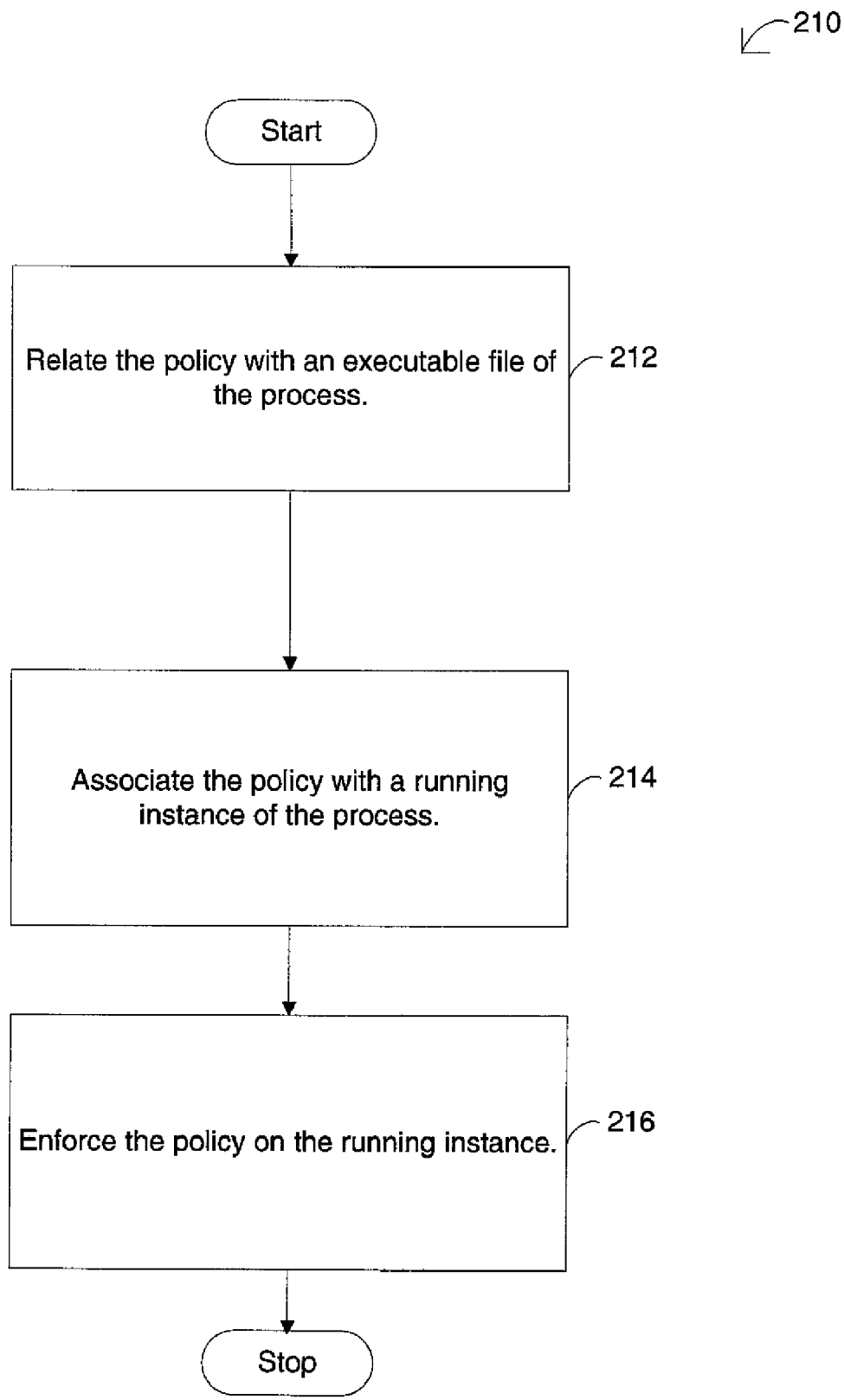
FIG. 2A is a flowchart in accordance with an exemplary embodiment of the present invention.

Referring to FIG. 2A, in an exemplary embodiment, the present invention includes a step 212 of relating the policy with an executable file of the process, a step 214 of associating the policy with a running instance of the process, and a step 216 of enforcing the policy on the running instance.

In an exemplary embodiment, the operating system includes the following features: (i) user-mode/kernel-mode privilege separation, (ii) virtual address space separation and protection between processes, (iii) the notion of users, and (iv) filtering frameworks to synchronously monitor processes when they access operating system resources. For example, the operating system could be a Microsoft® Corporation Windows® (hereinafter "Windows") operating system, a UNIX® operating system, or an Apple Inc. MAC OS X operating system.

Figure 2B:
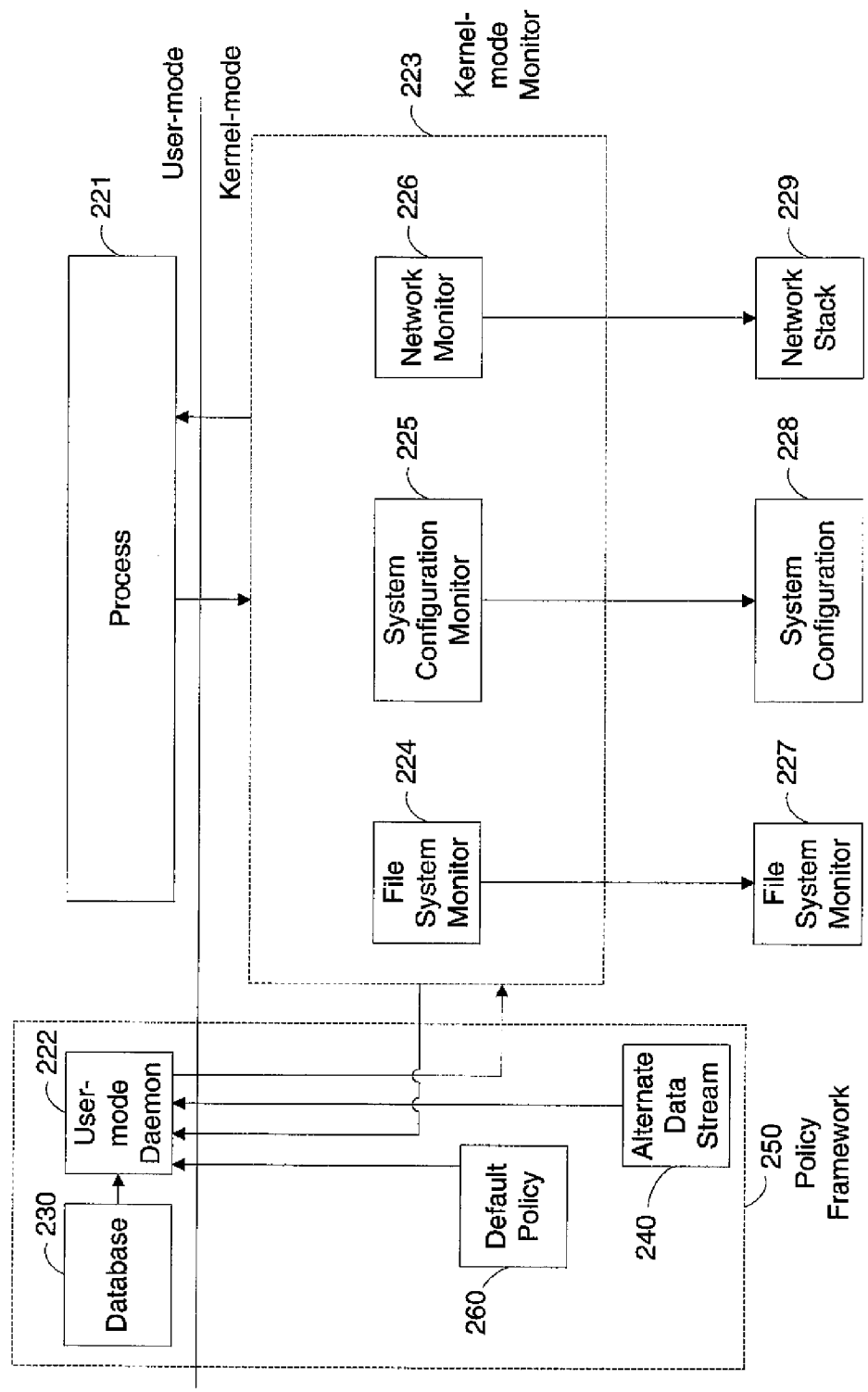
FIG. 2B is a block diagram in accordance with an exemplary embodiment of the present invention.

Referring to FIG. 2B, in an exemplary embodiment, when a process 221 in user-mode (i.e., a user-mode process) attempts to access system resources, kernel-monitor 223 detects the attempted access. In an exemplary embodiment, kernel-mode monitor 223 includes a file system monitor 224, a system configuration monitor 225, and a network monitor 226, which monitor accesses to the file system 227 of the computer system, the system configuration 228 of the computer system, and the network stack 229 of the computer system, respectively. If monitor 223 detects a process-creation notification associated with process 221, monitor classifies the process as running under an unclassified policy If the monitor detects at least one access by the process to the computer system and if the process is running under an unclassified policy, monitor 223 records the process identifier (process-id) of process 221, blocks process 221 from proceeding further, and forwards the process identifier to a privileged user-mode daemon 222. Daemon 222 verifies process 221 by retrieving the policy for process 221 (i) either from database 230 or alternate data stream 240 or (ii) retrieving default policy 260, where daemon 222, database 230, alternate data stream 240, and default policy 260 logically form a policy framework 250. Once the policy has been retrieved, monitor 223 enforces the policy on the access that had been detected by monitor 223 and enforces the policy on subsequent operations of process 221.

Relating the Policy

Figure 3A:
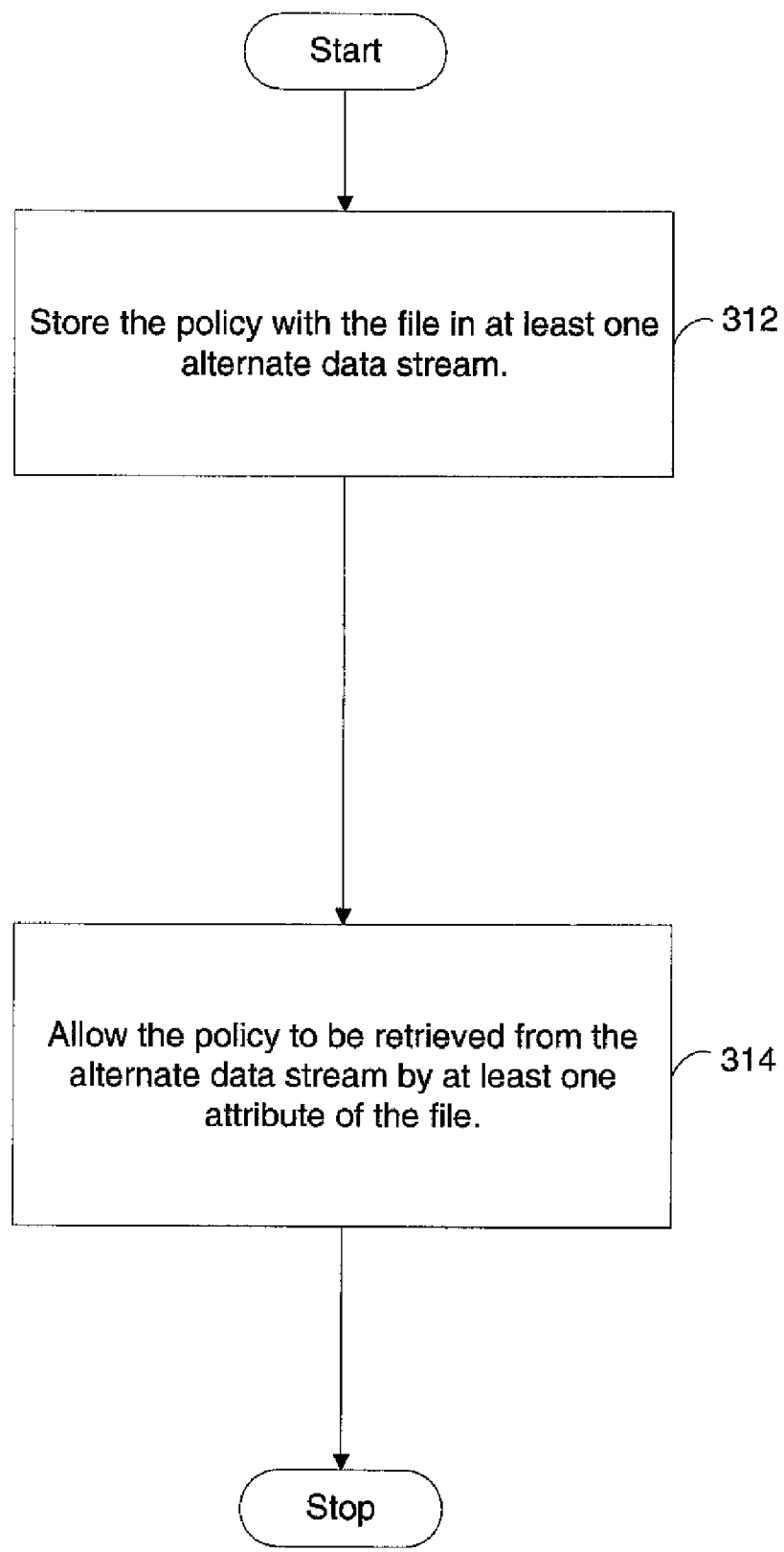
FIG. 3A is a flowchart of the relating step in accordance with an exemplary embodiment of the present invention.
Figure 3B:
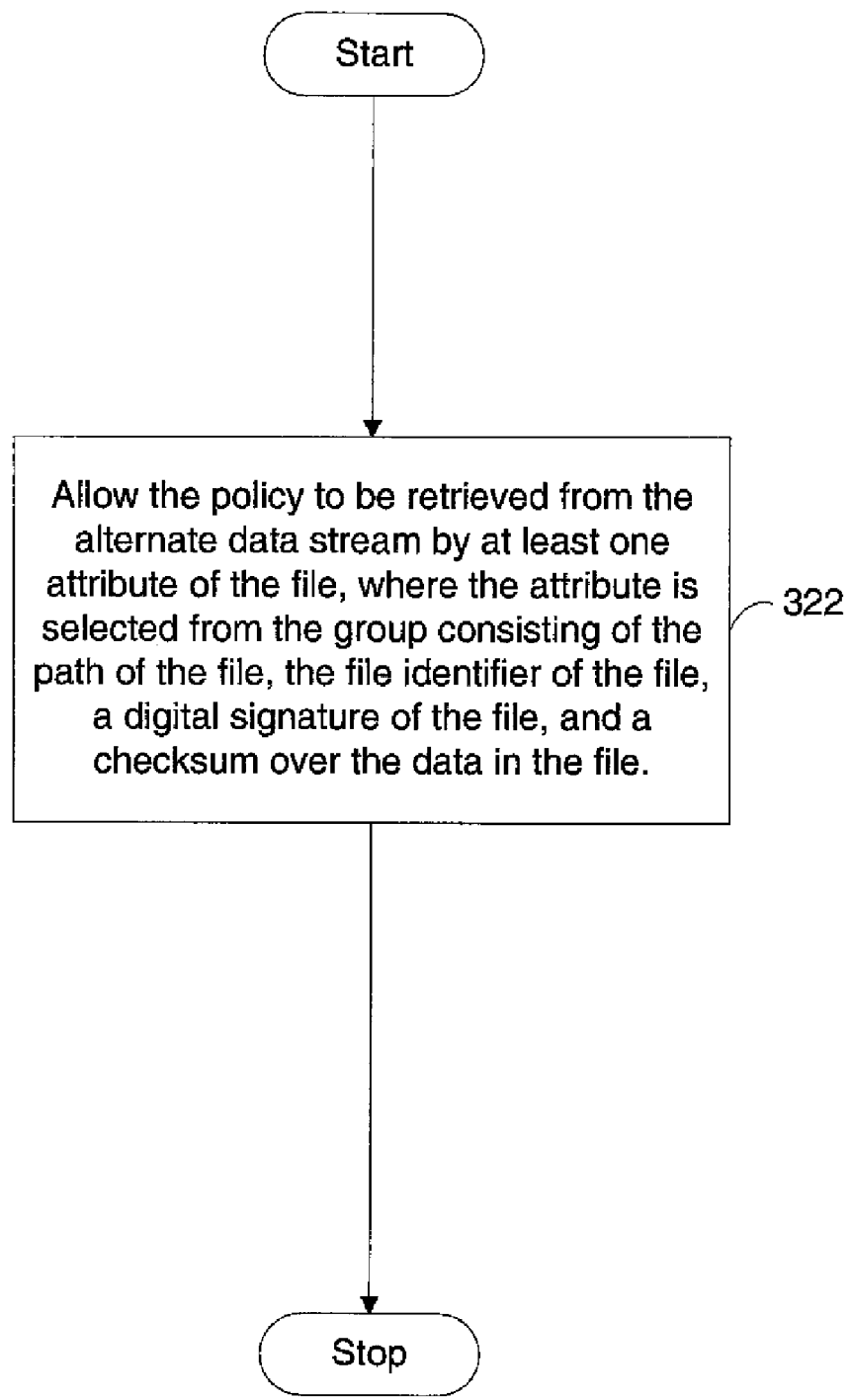
FIG. 3B is a flowchart of the allowing step in accordance with an exemplary embodiment of the present invention.

Referring to FIG. 3A, in an exemplary embodiment, relating step 212 includes a step 312 of storing the policy with the file in at least one alternate data stream and a step 314 of allowing the policy to be retrieved from the alternate data stream by at least one attribute of the file. In a Windows operating system, the invention can store the policy in at least one NT file system (NTFS) alternate data stream and can retrieve the policy from the NTFS alternate data stream. Referring to FIG. 3B, in an exemplary embodiment, allowing step 314 includes a step 322 of allowing the policy to be retrieved from the alternate data stream by at least one attribute of the file, where the attribute is selected from the group consisting of the path of the file, the file identifier (file-id) of the file, a digital signature of the file, and a checksum over the data in the file.

Figure 3C:
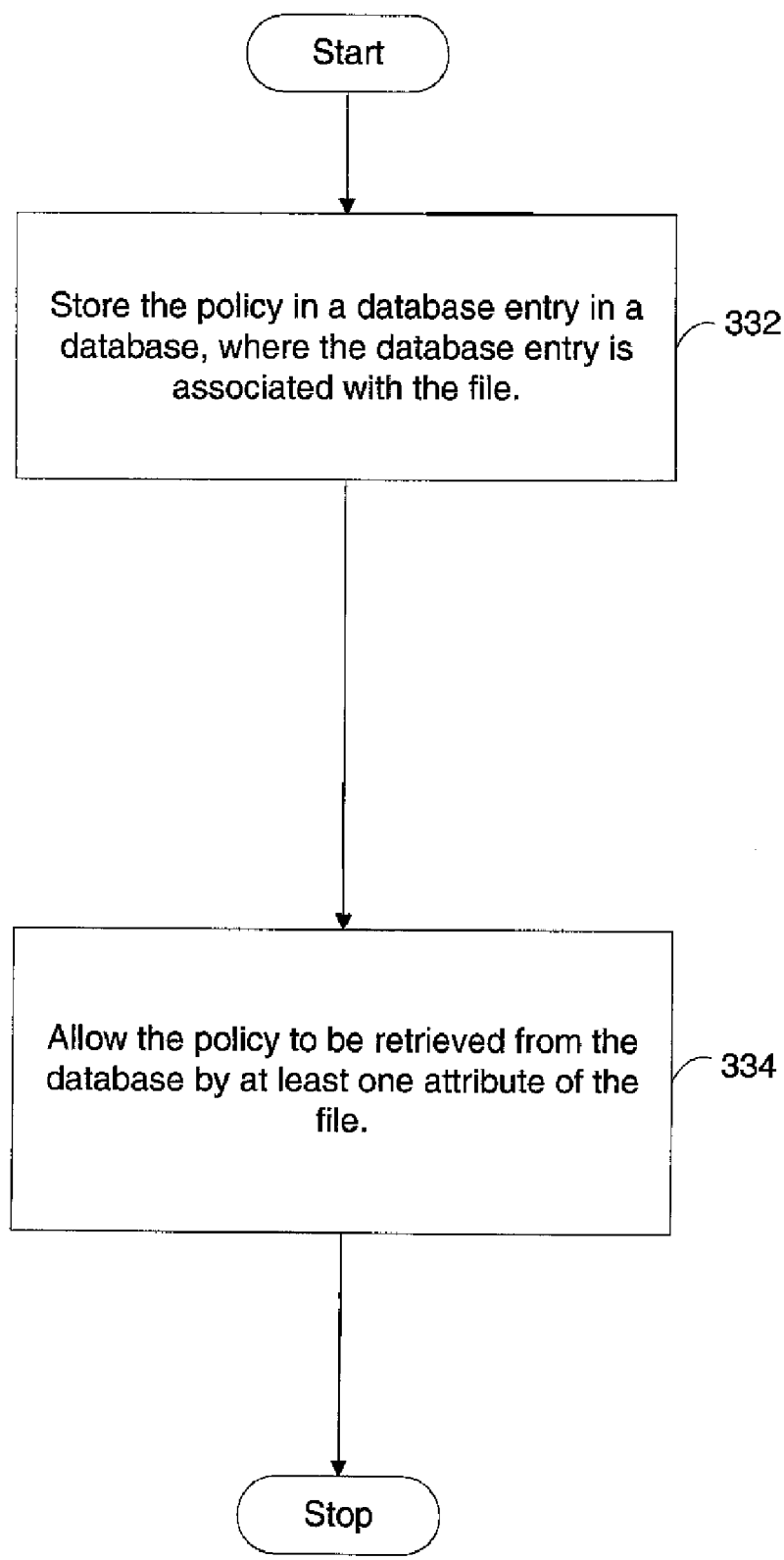
FIG. 3C is a flowchart of the relating step in accordance with an exemplary embodiment of the present invention.
Figure 3D:
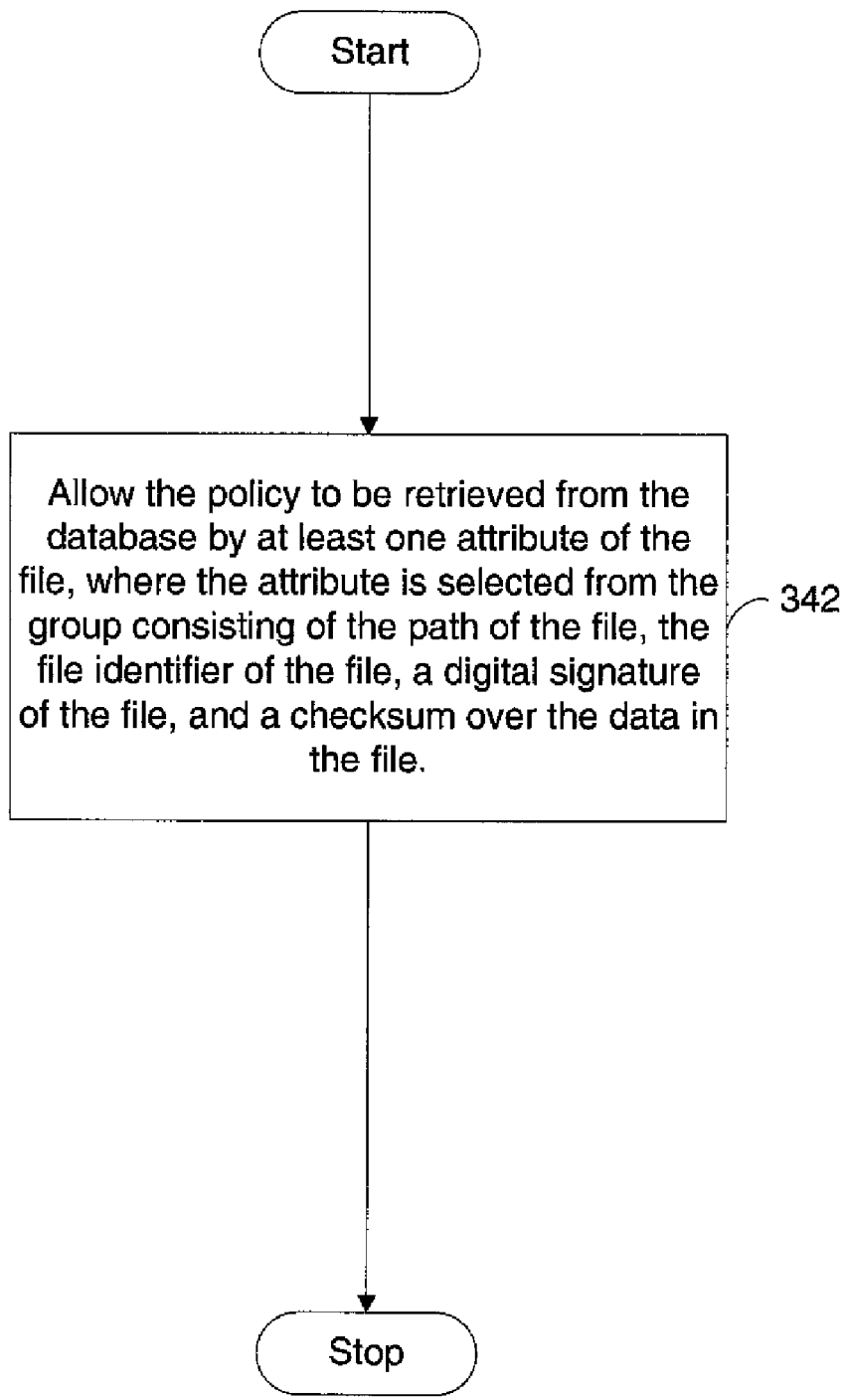
FIG. 3D is a flowchart of the allowing step in accordance with an exemplary embodiment of the present invention.

Referring to FIG. 3C, in an exemplary embodiment, relating step 212 includes a step 332 storing the policy in a database entry in a database, where the database entry is associated with the file and a step 334 of allowing the policy to be retrieved from the database by at least one attribute of the file. Referring to FIG. 3D, in an exemplary embodiment, allowing step 334 includes a step 342 of allowing the policy to be retrieved from the database by at least one attribute of the file, where the attribute is selected from the group consisting of the path of the file, the file identifier (file-id) of the file, a digital signature of the file, and a checksum over the data in the file.

Associating the Policy

Figure 4A:
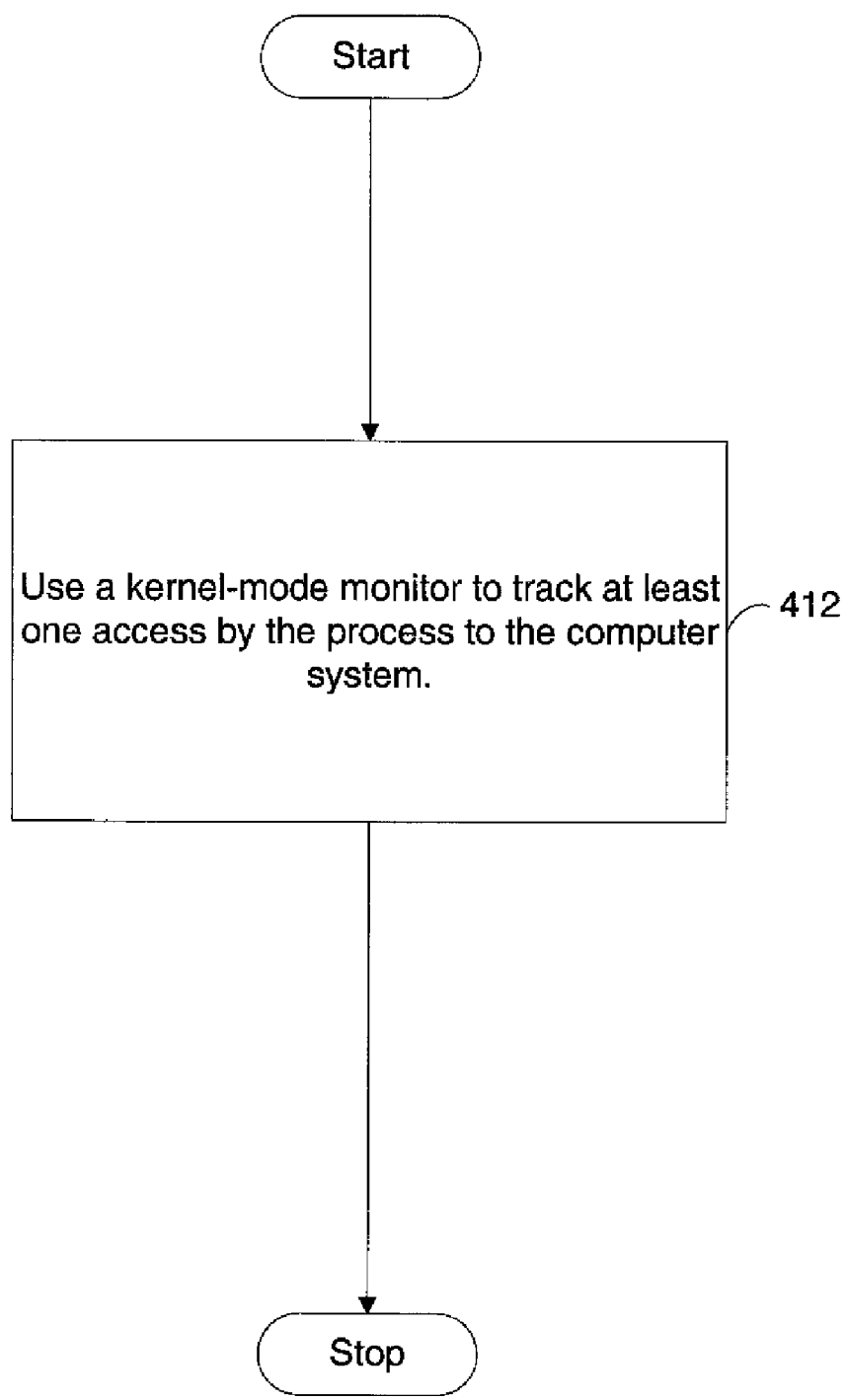
FIG. 4A is a flowchart of the associating step in accordance with an exemplary embodiment of the present invention.
Figure 4B:
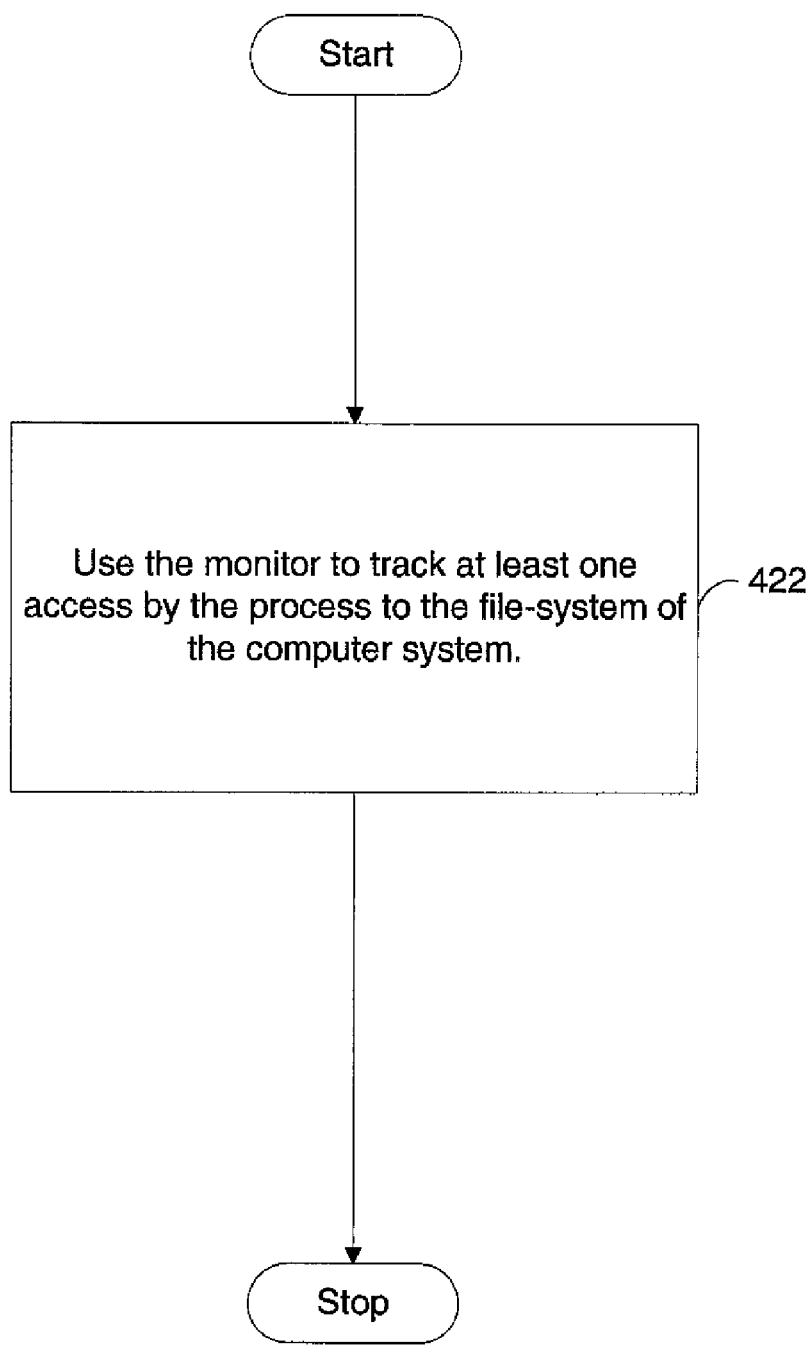
FIG. 4B is a flowchart of the using step in accordance with an exemplary embodiment of the present invention.
Figure 4C:
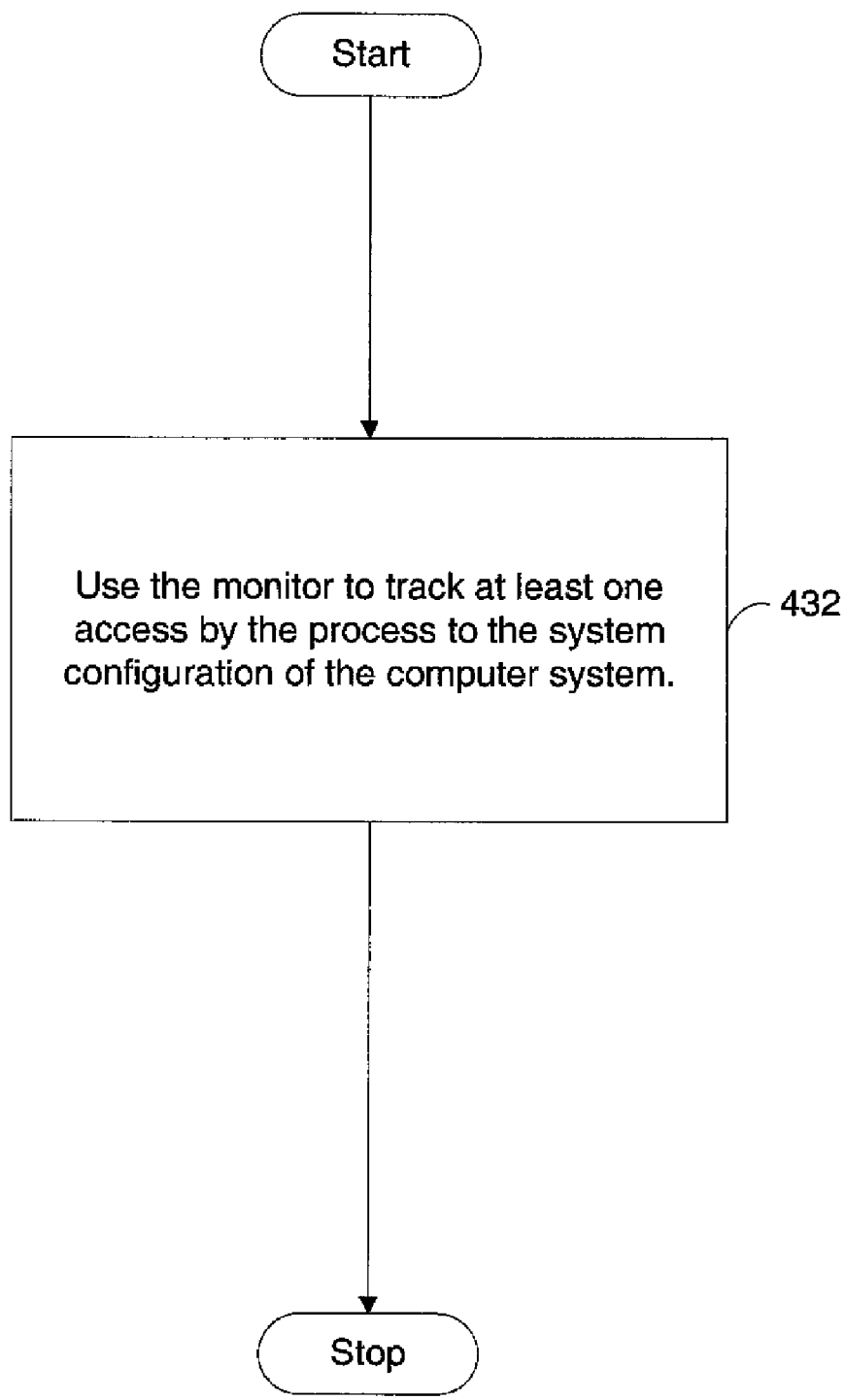
FIG. 4C is a flowchart of the using step in accordance with an exemplary embodiment of the present invention.
Figure 4D:
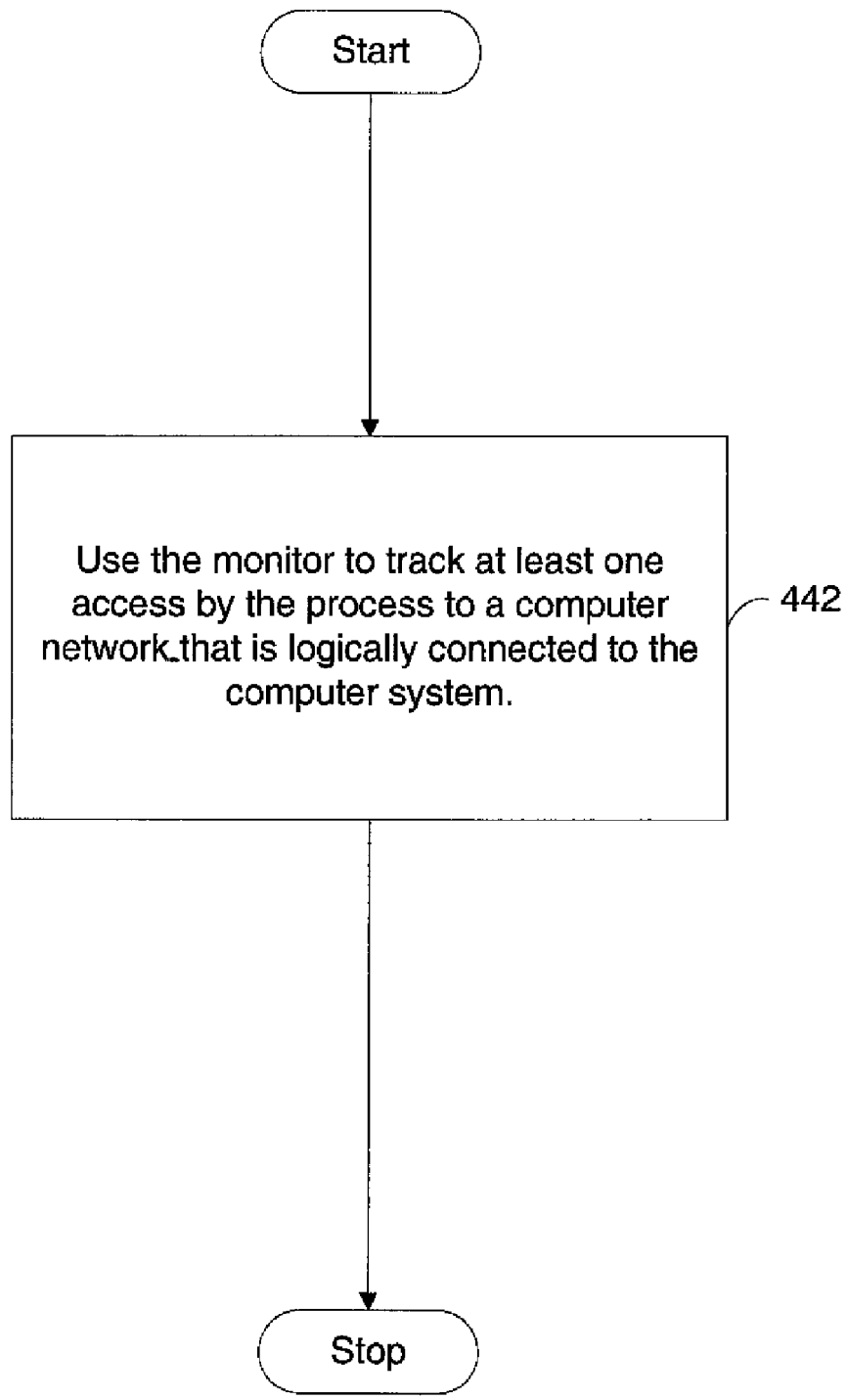
FIG. 4D is a flowchart of the using step in accordance with an exemplary embodiment of the present invention.

Referring to FIG. 4A, in an exemplary embodiment, associating step 214 includes a step 412 of using a kernel-mode monitor to track at least one access by the process to the computer system. Referring to FIG. 4B, in an exemplary embodiment, using step 412 includes a step 422 of using the monitor to track at least one access by the process to the file-system of the computer system. Referring to FIG. 4C, in an exemplary embodiment, using step 412 includes a step 432 of using the monitor to track at least one access by the process to the system configuration of the computer system. For example, in a Windows operating system, the system configuration is the registry of the operating system. Referring to FIG. 4D, in an exemplary embodiment, using step 412 includes a step 442 of using the monitor to track at least one access by the process to a computer network that is logically connected to the computer system.

If the Monitor Detects a Process-Creation Notification

Figure 5:
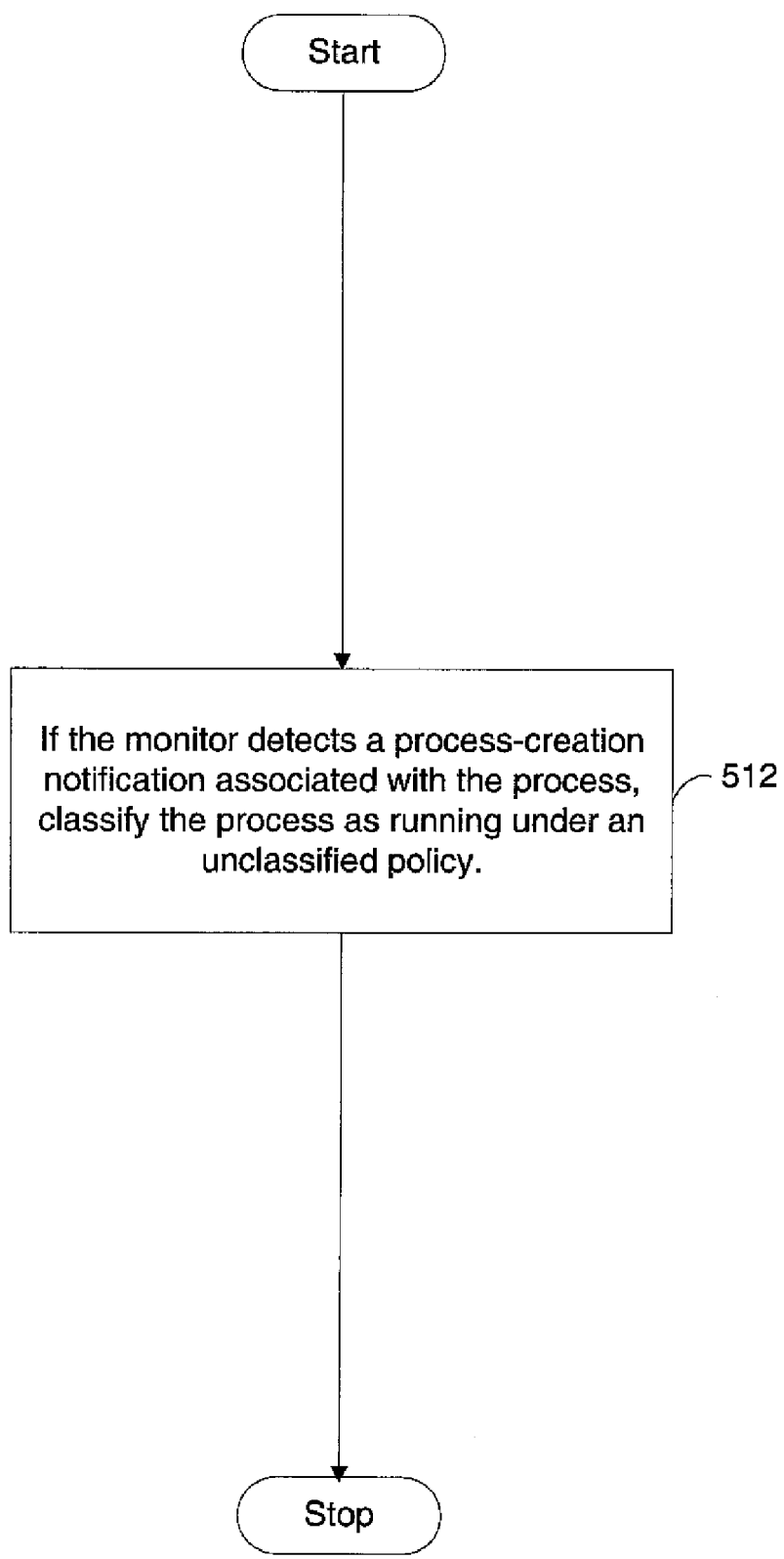
FIG. 5 is a flowchart of the using step in accordance with an exemplary embodiment of the present invention.

Referring to FIG. 5, in an exemplary embodiment, using step 412 includes, if the monitor detects a process-creation notification associated with the process, a step 512 of classifying the process as running under an unclassified policy.

If the Monitor Detects at Least One Access

Figure 6:
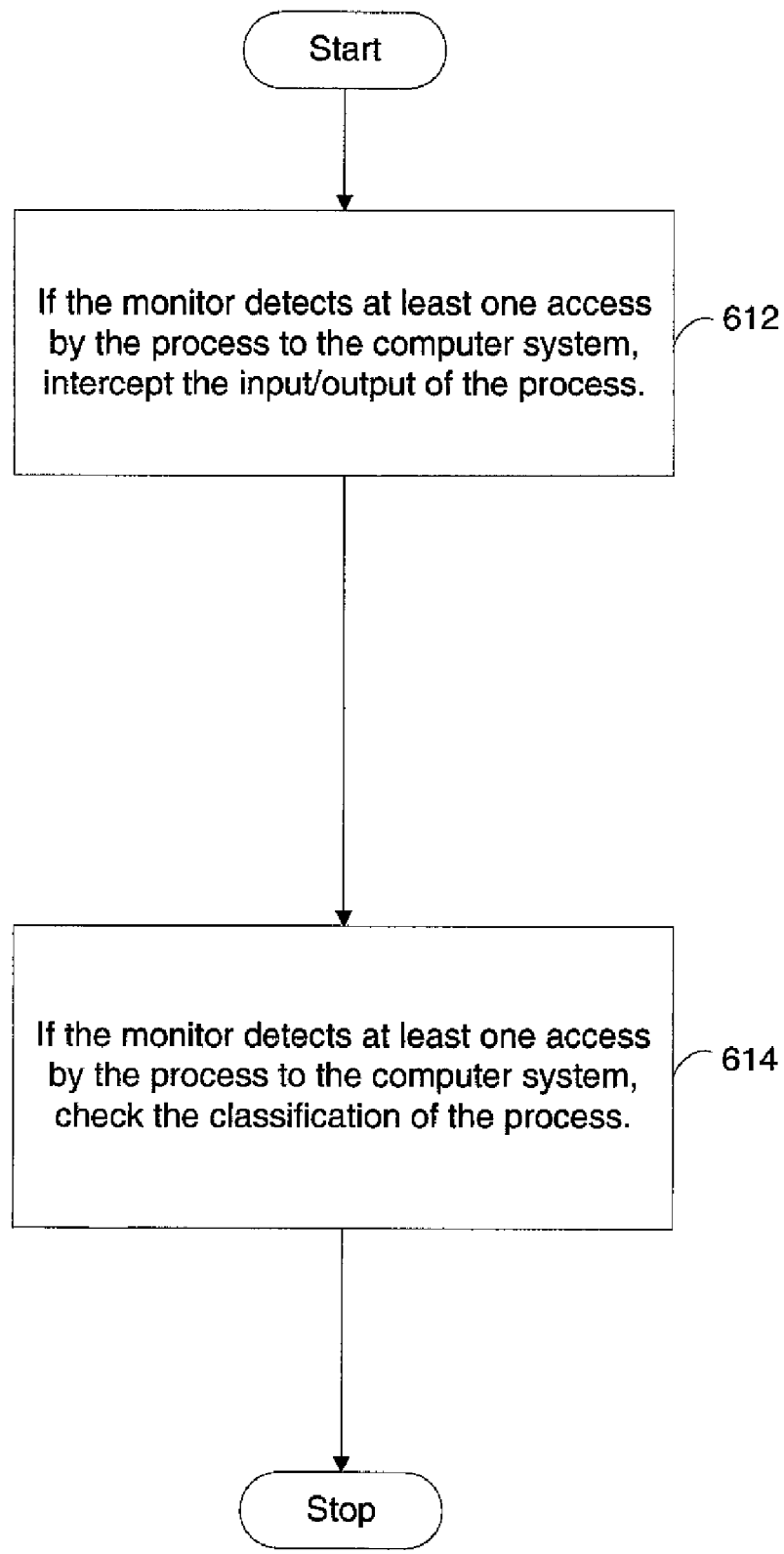
FIG. 6 is a flowchart of the using step in accordance with an exemplary embodiment of the present invention.

Referring to FIG. 6, in an exemplary embodiment, using step 412 includes, if the monitor detects at least one access by the process to the computer system, a step 612 of intercepting the input/output of the process and a step 614 of checking the classification of the process.

Classification of the Process Equals "unclassified—default policy"

Figure 7A:
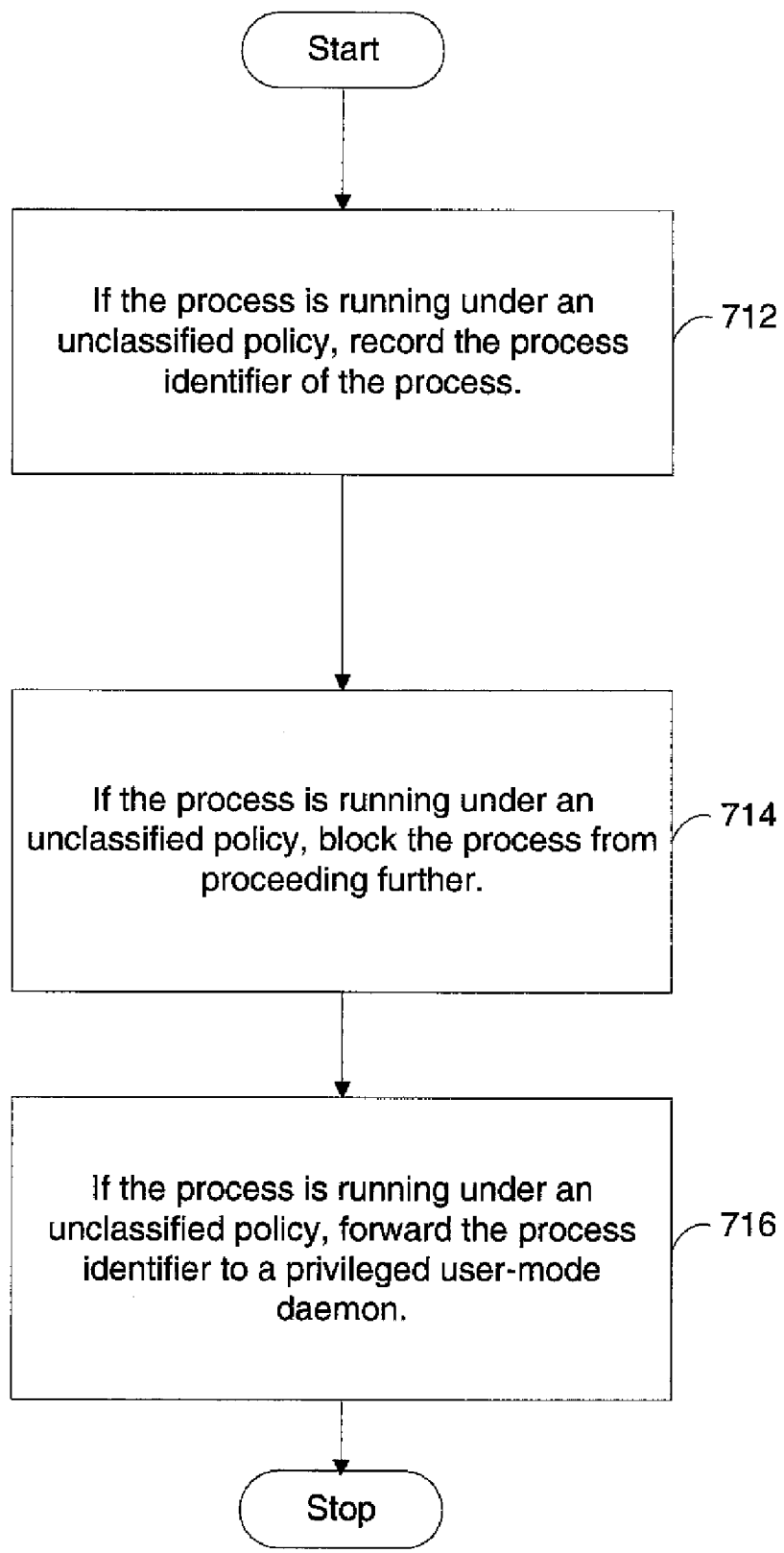
FIG. 7A is a flowchart in accordance with a further embodiment of the present invention.
Figure 7B:
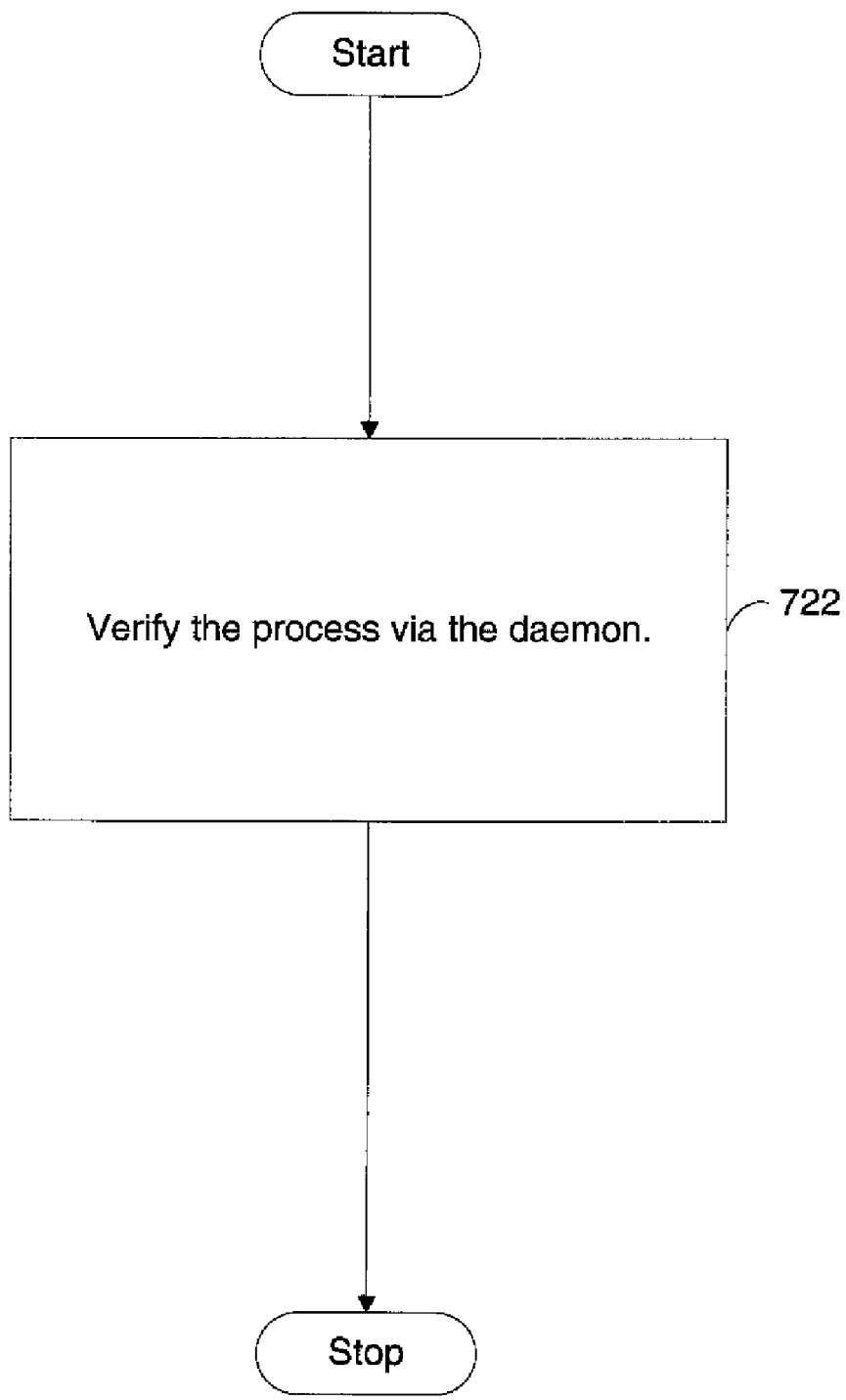
FIG. 7B is a flowchart in accordance with a further embodiment of the present invention.

Referring to FIG. 7A, in a further embodiment, using step 412 further includes, if the process is running under an unclassified policy, a step 712 of recording the process identifier (process-id) of the process, a step 714 of blocking the process from proceeding further, and a step 716 of forwarding the process identifier to a privileged user-mode daemon. Referring to FIG. 7B, in a further embodiment, checking step 614 further includes a step 722 of verifying the process via the daemon.

Figure 7C:
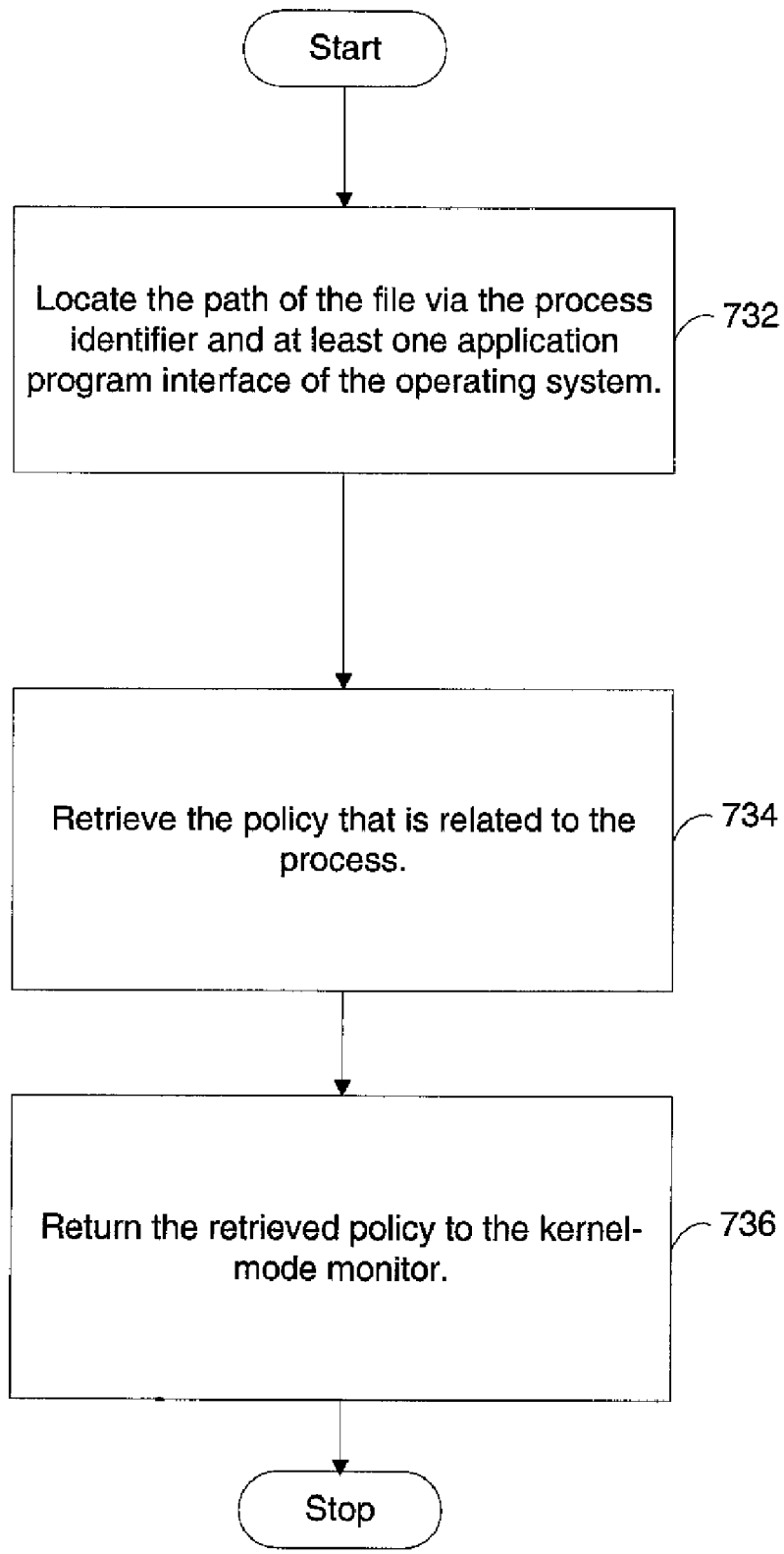
FIG. 7C is a flowchart of the verifying step in accordance with an exemplary embodiment of the present invention.
Figure 7D:
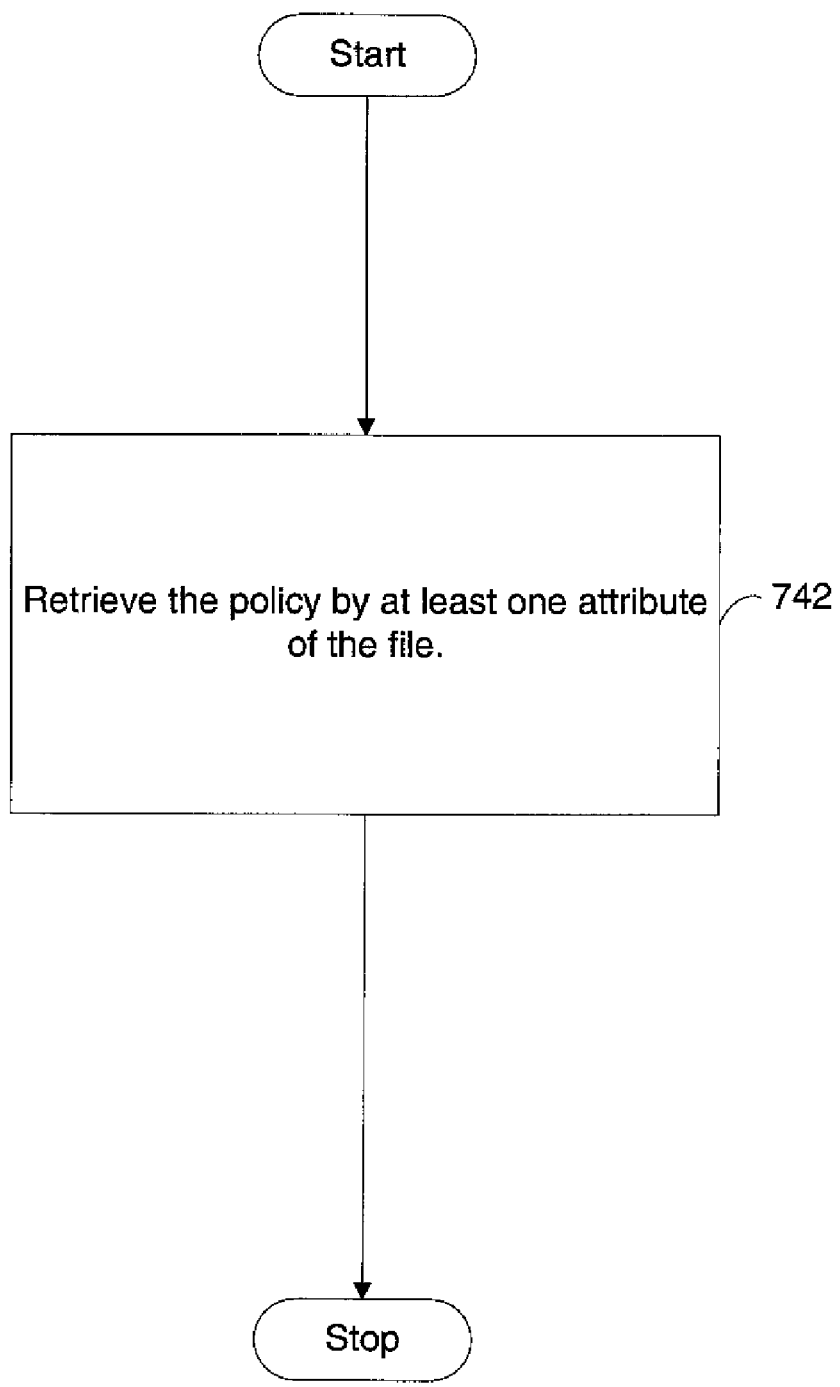
FIG. 7D is a flowchart of the retrieving step in accordance with an exemplary embodiment of the present invention.

Referring to FIG. 7C, in an exemplary embodiment, verifying step 722 includes a step 732 of locating the path of the file via the process identifier and at least one application program interface (API) of the operating system, a step 734 of retrieving the policy that is related to the process, and a step 736 of returning the retrieved policy to the kernel-mode monitor. Referring to FIG. 7D, in an exemplary embodiment, retrieving step 734 includes a step 742 of retrieving the policy by at least one attribute of the file.

Figure 7E:
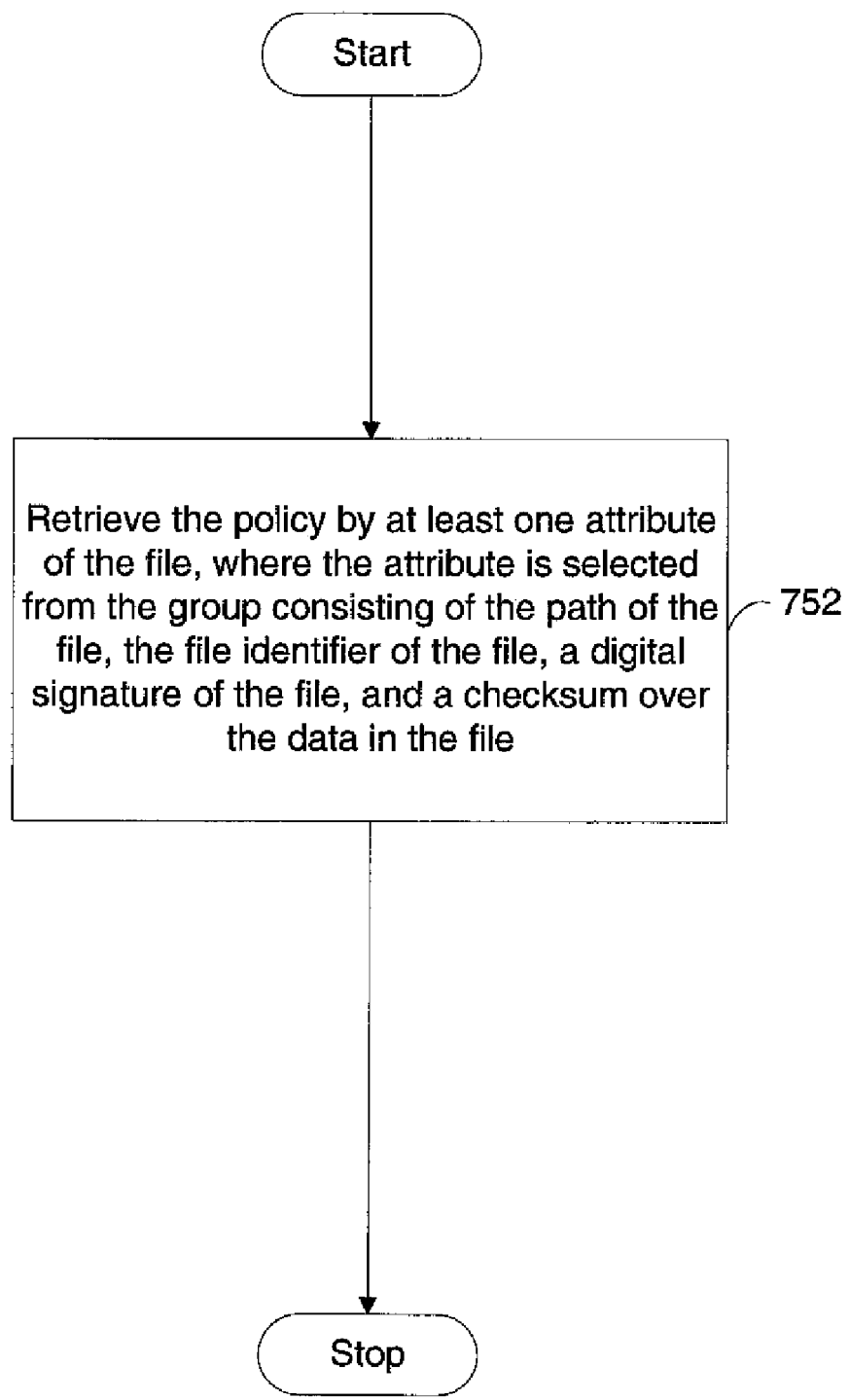
FIG. 7E is a flowchart of the retrieving step in accordance with an exemplary embodiment of the present invention.
Figure 7F:
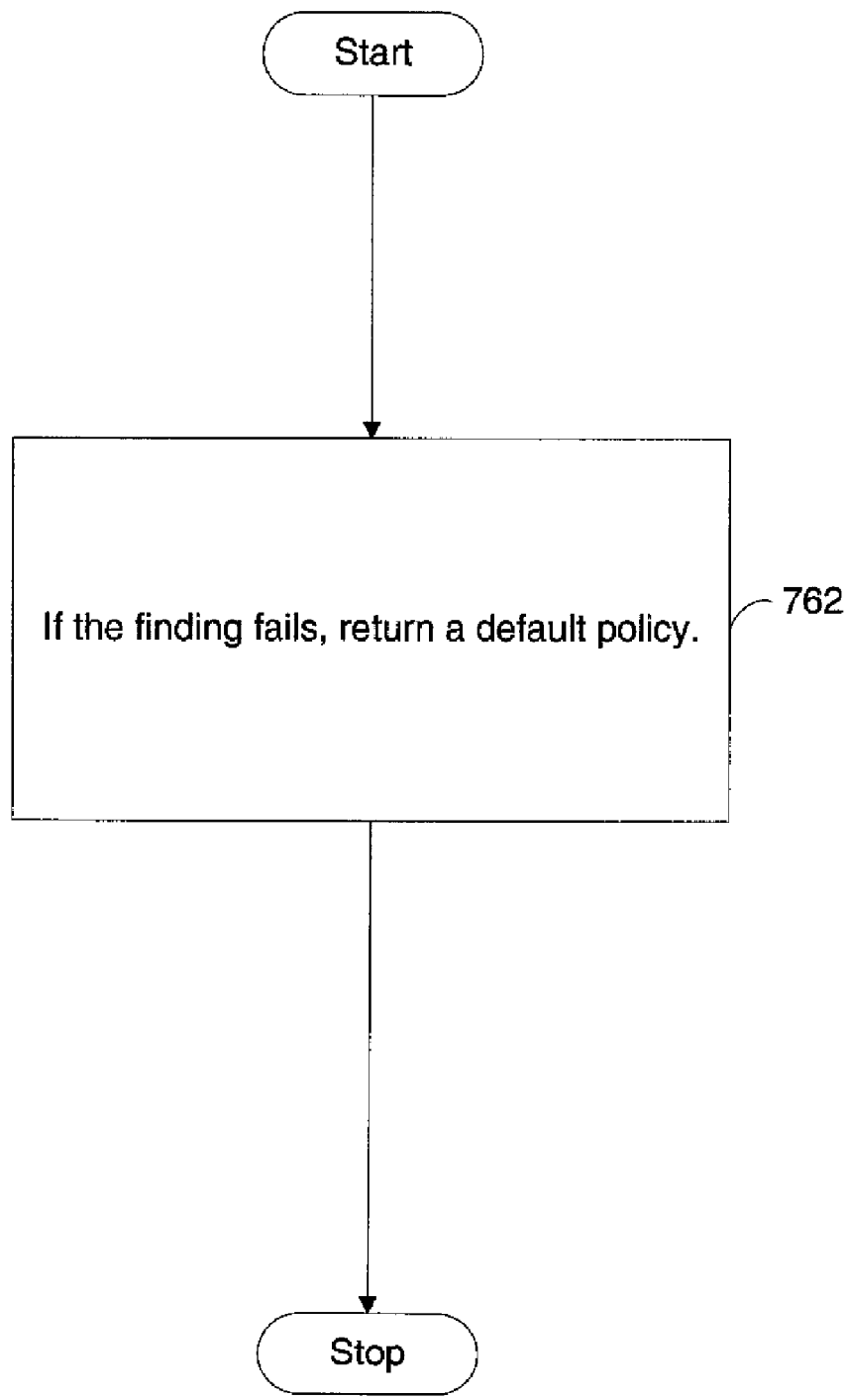
FIG. 7F is a flowchart in accordance with a further embodiment of the present invention.

Referring to FIG. 7E, in an exemplary embodiment, retrieving step 742 includes a step 752 of finding the policy by at least one attribute of the file, where the attribute is selected from the group consisting of the path of the file, the file identifier of the file, a digital signature of the file, and a checksum over the data in the file and a step 754 of returning the found policy. Referring to FIG. 7F, in a further embodiment, retrieving step 742 further includes, if the finding fails, a step 762 of returning a default policy.

Enforcing the Policy

Figure 8A:
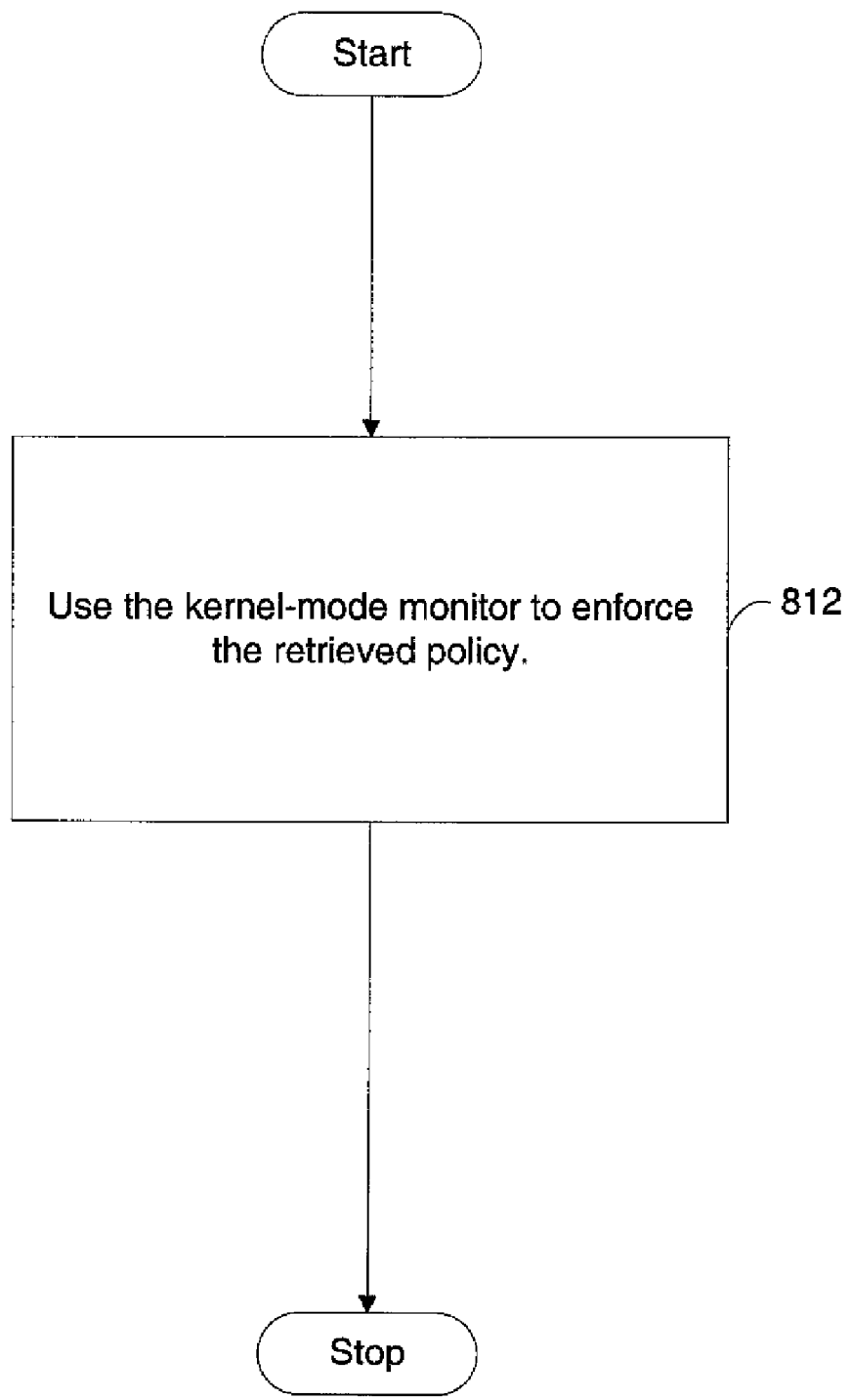
FIG. 8A is a flowchart of the enforcing step in accordance with an exemplary embodiment of the present invention.
Figure 8B:
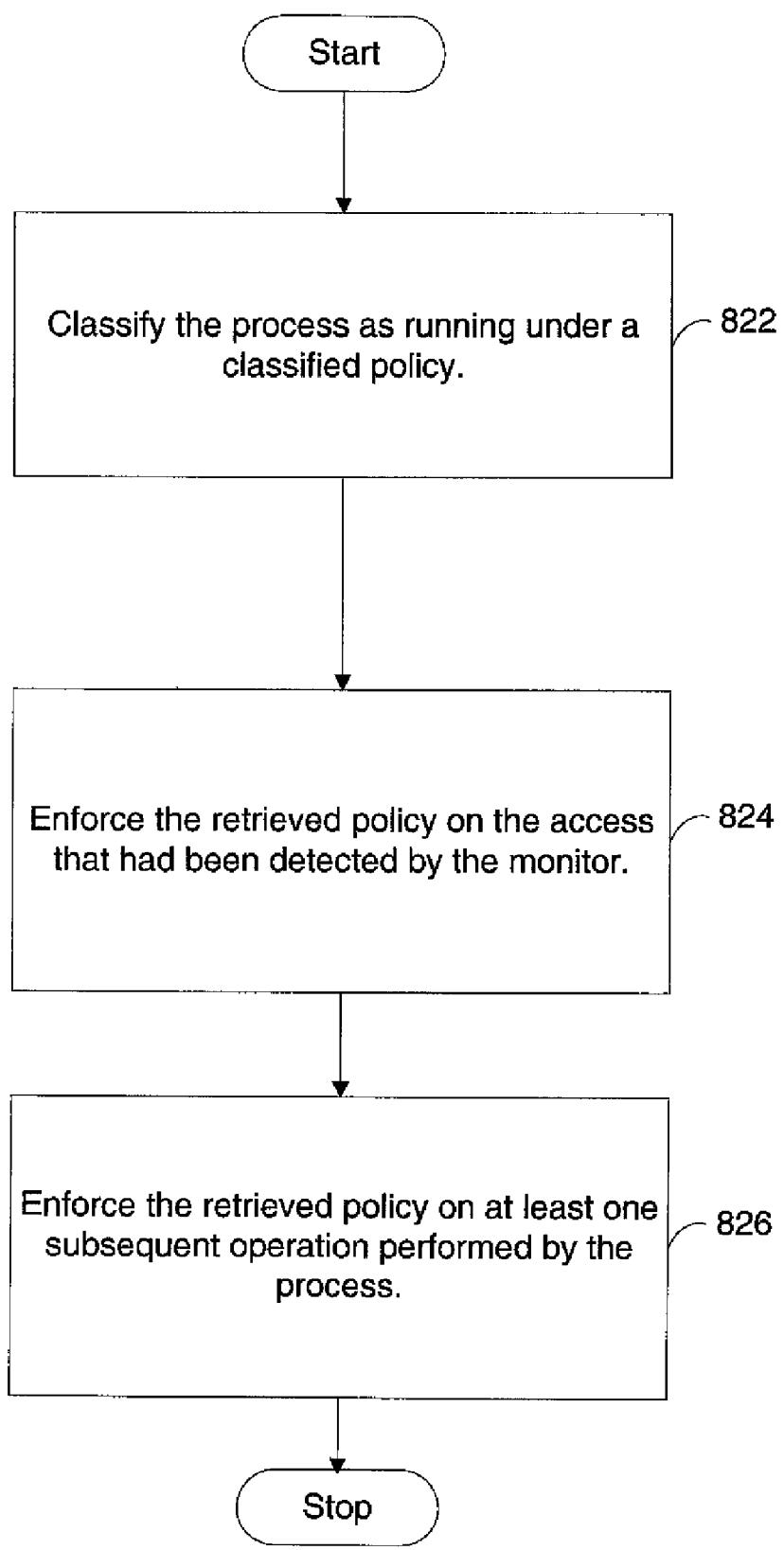
FIG. 8B is a flowchart of the using step in accordance with an exemplary embodiment of the present invention.

Referring to FIG. 8A, in an exemplary embodiment, enforcing step 216 includes a step 812 of using the kernel-mode monitor to enforce the retrieved policy. Referring to FIG. 8B, in an exemplary embodiment, using step 812 includes a step 822 of classifying the process as running under a classified policy, a step 824 of enforcing the retrieved policy on the access that had been detected by the monitor, and a step 826 of enforcing the retrieved policy on at least one subsequent operation performed by the process.

In an exemplary embodiment, the invention further includes after the process has been classified, using the daemon and the monitor to update the policy for the process dynamically.

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters.

Conclusion

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of specifying and enforcing run-time policies for application processes being executed on a computer, comprising:
    relating a run-time policy with an executable file of an application process to be executed on a computer;
    tracking access by said application process to a computer resource selected from the group consisting of: a file system, the computer's system configuration, and the computer's network stack, wherein said tracking is performed using a kernel-mode monitor;
    in response to said application process: 1) initializing, 2) executing, and 3) performing a first access from the computer's user mode to one of said computer resources, retrieving and returning said run-time policy to the kernel-mode monitor;
    associating said run-time policy with said application process; and
    enforcing said run-time policy on said application process using the kernel-mode monitor thereby resulting in each running instance of said application process being maintained, wherein using the kernel-mode monitor for said enforcing comprises: classifying said application process as running under a classified run-time policy, enforcing the retrieved run-time policy on the access that had been detected by the kernel-mode monitor, and enforcing the retrieved run-time policy on at least one subsequent operation performed by said application process.

2. The method of claim 1, wherein said relating comprises:
    storing said run-time policy with the executable file in at least one alternate data stream; and
    allowing said run-time policy to be retrieved from the alternate data stream by at least one attribute of the executable file.

3. The method of claim 1, wherein said relating comprises:
    storing said run-time policy in a database entry in a database, wherein the database entry is associated with the executable file; and
    allowing said run-time policy to be retrieved from the database by at least one attribute of the executable file.

4. The method of claim 2, wherein said allowing comprises:
    allowing said run-time policy to be retrieved from the alternate data stream by at least one attribute of the executable file selected from the group consisting of: the path of the executable file, the file identifier of the executable file, a digital signature of the executable file, and a checksum over the data in the executable file.

5. The method of claim 3, wherein said allowing comprises:
    allowing said run-time policy to be retrieved from the database by at least one attribute of the executable file selected from the group consisting of: the path of the executable file, the file identifier of the executable file, a digital signature of the executable file, and a checksum over the data in the executable file.

6. The method of claim 1, wherein said tracking comprises:
    if the kernel-mode monitor detects a process-creation notification associated with said application process, classifying said application process as running under an unclassified policy.

7. The method of claim 6, further comprising:
    if the kernel-mode monitor detects at least one access by said application process to the computer:
        intercepting the input/output of said application process, and
        checking the classification of said application process.

8. The method of claim 7, further comprising:
    if said application process is running under an unclassified policy:
        recording a process identifier of said application process,
        blocking said application process from proceeding further, and
        forwarding the process identifier to a privileged user-mode daemon.

9. The method of claim 8, further comprising:
    verifying said application process via the daemon.

10. The method of claim 9, wherein said verifying comprises:
    locating the path of the file via the process identifier and at least one application program interface of the computer's operating system;
    retrieving the run-time policy that is related to said application process; and
    returning the retrieved run-time policy to the kernel-mode monitor.

11. The method of claim 10, wherein said retrieving comprises:
    retrieving the run-time policy by at least one attribute of the file.

12. The method of claim 11, wherein the retrieving comprises:
    finding the run-time policy by at least one attribute selected from the group consisting of: the path of the executable file, the file identifier of the executable file, a digital signature of the executable file, and a checksum over the data in the executable file; and
    returning the found run-time policy.

13. The method of claim 12, further comprising:
    if the finding fails, returning a default run-time policy.

14. A non-transitory computer program product specifying and enforcing at least one run-time policy for run-time policies for application processes being executed on a computer the computer program product comprising a computer readable storage medium having computer readable program code embodied therewith, the computer readable program code comprising computer readable program code configured to:
    relate a run-time policy with an executable file of an application process to be executed on a computer;
    track access by said application process to a computer resource selected from the group consisting of: a file system, the computer's system configuration, and the computer's network stack, wherein said track is performed using a kernel-mode monitor;
    in response to said application process: 1) initialize, 2) execute, and 3) perform a first access from the computer's user mode to one of said computer resources, retrieve and return said run-time policy to the kernel-mode monitor;
    associate said run-time policy with said application process; and
    enforce said run-time policy on said application process using the kernel-mode monitor thereby resulting in each running instance of said application process being maintained, wherein using the kernel-mode monitor for said enforcing comprises: classifying said application process as running under a classified run-time policy, enforcing the retrieved run-time policy on the access that had been detected by the kernel-mode monitor, and enforcing the retrieved run-time policy on at least one subsequent operation performed by said application process.

15. The computer program product of claim 14, wherein said track comprises:
    if the kernel-mode monitor detects a process-creation notification associated with said application process, classify said application process as running under an unclassified policy.

16. The computer program product of claim 15, further comprising:
    if the kernel-mode monitor detects at least one access by said application process to the computer:
        intercept the input/output of said application process, and
        check the classification of said application process.

17. The computer program product of claim 16, further comprising:
    if said application process is running under an unclassified policy:
        record a process identifier of said application process,
        block said application process from proceeding further, and
        forward the process identifier to a privileged user-mode daemon.

18. The computer program product of claim 17, further comprising:
    verify said application process using the privileged user-mode daemon.

19. The computer program product of claim 18, wherein said verify comprises:
    locate the path of the file via the process identifier and at least one application program interface of the computer's operating system;
    retrieve the run-time policy that is related to said application process; and
    return the retrieved run-time policy to the kernel-mode monitor.

20. The computer program product of claim 19, wherein said retrieve comprises:
    retrieve the run-time policy by at least one attribute of the file by:
        finding the run-time policy by at least one attribute selected from the group consisting of: the path of the executable file, the file identifier of the executable file, a digital signature of the executable file, and a checksum over the data in the executable file, and
        if the run-time policy if found, return the found run-time policy.
        if the finding fails, return a default run-time policy.

21. The method of claim 1, wherein said run-time policy is associated with said application process using the computer's operating system Application Programming Interface (API).

* * * * *